United States Patent
Feng et al.

(10) Patent No.: US 9,810,929 B2
(45) Date of Patent: Nov. 7, 2017

(54) THERMOCHROMATIC DISPLAY DEVICE

(71) Applicant: Beijing FUNATE Innovation Technology Co., LTD., Beijing (CN)

(72) Inventors: Chen Feng, Beijing (CN); Yu-Quan Wang, Beijing (CN); Li Qian, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 70 days.

(21) Appl. No.: 14/967,334

(22) Filed: Dec. 13, 2015

(65) Prior Publication Data

US 2016/0097941 A1 Apr. 7, 2016

Related U.S. Application Data

(63) Continuation of application No. 13/874,463, filed on Apr. 30, 2013, now Pat. No. 9,244,294.

(30) Foreign Application Priority Data

Oct. 15, 2012 (CN) .......................... 2012 1 0389392

(51) Int. Cl.
| | | |
|---|---|---|
| *G02F 1/153* | (2006.01) | |
| *G02B 26/08* | (2006.01) | |
| *G02F 1/29* | (2006.01) | |
| *G02F 1/01* | (2006.01) | |
| *B82Y 20/00* | (2011.01) | |

(52) U.S. Cl.
CPC ............ *G02F 1/0147* (2013.01); *B82Y 20/00* (2013.01); *G02F 2201/12* (2013.01); *Y10S 977/952* (2013.01)

(58) Field of Classification Search
USPC ........ 359/237, 242, 245–247, 288, 290–295, 359/298
See application file for complete search history.

(56) References Cited

U.S. PATENT DOCUMENTS

| | | | | |
|---|---|---|---|---|
| 2007/0096630 A1* | 5/2007 | Chung | .................... | H01J 9/025 313/497 |
| 2011/0317244 A1* | 12/2011 | Liu | ........................ | G02B 26/02 359/288 |

FOREIGN PATENT DOCUMENTS

| | | | | |
|---|---|---|---|---|
| CN | 101400198 A | 4/2009 | | |
| CN | 101923227 A | 12/2010 | | |
| JP | 02011128616 | * | 6/2011 | ............... G09F 9/30 |

* cited by examiner

*Primary Examiner* — Brandi Thomas
(74) *Attorney, Agent, or Firm* — Steven Reiss

(57) ABSTRACT

A thermochromatic display device includes a first electrode sheet, a second electrode sheet and a plurality of thermochromatic elements. Each of the thermochromatic elements includes a sealed enclosure, an insulation layer and a first heating element. The first heating element includes a carbon nanotube film including a number of carbon nanotube linear units and a number of carbon nanotube groups. Each carbon nanotube linear unit includes a number of first carbon nanotubes substantially oriented along a first direction, and are spaced from each other and substantially extending along the first direction. The carbon nanotube groups are combined with the carbon nanotube linear units by van der Waals force.

17 Claims, 11 Drawing Sheets

THERMOCHROMATIC DISPLAY DEVICE

RELATED APPLICATIONS

This application is a continued application of U.S. patent application Ser. No. 13/874,463, filed on Apr. 30, 2013, entitled, "THERMOCHROMATIC ELEMENT AND THERMOCHROMATIC DISPLAY DEVICE". The disclosures of the above-identified applications are incorporated herein by reference.

BACKGROUND

1. Technical Field

The present disclosure relates to a thermochromatic display device.

2. Discussion of Related Art

E-paper is a kind of display technology without back light module. E-paper can replace a traditional paper and can be used in advertisement, newspaper, books, and so on. Therefore, E-paper has a wide application foreground and a great commerce value.

At present, E-paper technology is mainly based on electrophoresis, wherein electric particles are used. The movement of the electric particles allows different images to be formed in the display. However, e-paper is restricted to black and white images and cannot show color images.

What is needed, therefore, is to provide a thermochromatic display device that can overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
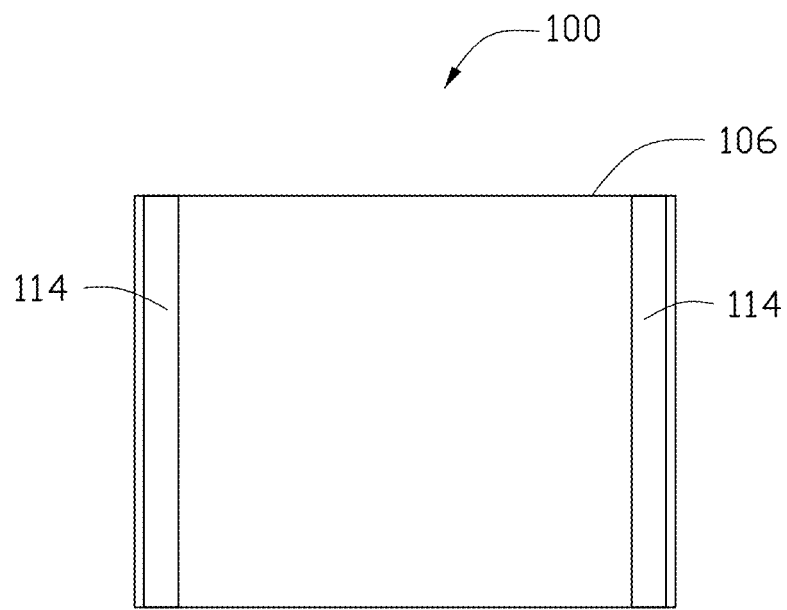
FIG. 1 is a schematic top plan view of one embodiment of a thermochromatic element.
Figure 2:
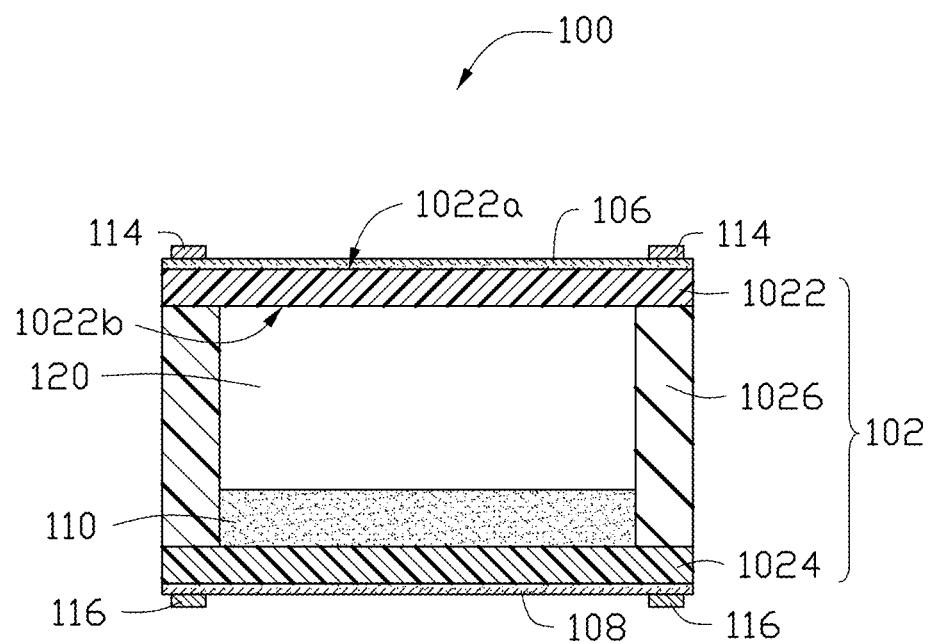
FIG. 2 is a cross-sectional side view of the thermochromatic element used in FIG. 1.

Referring to FIG. 1 and FIG. 2, a thermochromatic element 100 of one embodiment is provided. The thermochromatic element 100 comprises a sealed enclosure 102, a first heating element 106, a second heating element 108, and a colorful material layer 110. The sealed enclosure 102 comprises an upper sheet 1022, a lower sheet 1024, and defines a chamber 120 between the upper sheet 1022 and the lower sheet 1024. The colorful material layer 110 is located in the chamber 120. The colorful material layer 110 is in a solid state at chamber temperature and can change into a gas state at a temperature higher than chamber temperature. The first heating element 106 is located on the upper sheet 1022. The second heating element 108 is located on the lower sheet 1024. The first heating element 106 and the second heating element 108 are both configured to heat the colorful material layer 110. The first heating element 106 and the second heating element 108 asynchronously produce heat, and the colorful material layer 110 moves between the first heating element 106 and the second heating element 108 in response to the heat produced by the first heating element 106 and the second heating element 108. The thermochromatic element 100 further comprises at least two first electrodes 114 and at least two second electrodes 116. The at least two first electrodes 114 are electrically connected with the first heating element 106. The at least two second electrodes 116 are electrically connected with the second heating element 108.

A shape of the sealed enclosure 102 can be cuboid or cylindrical. In one embodiment according to FIG. 2, the sealed enclosure 102 of the thermochromatic element 100 has a cube structure. The sealed enclosure 102 further comprises four side sheets 1026 located between the upper sheet 1022 and the lower sheet 1024 to form the cubic sealed enclosure 102. The upper sheet 1022 comprises a first upper surface 1022a and a first lower surface 1022b opposite with the first upper surface 1022a. The first lower surface 1022b is located in the chamber 120. The lower sheet 1024 comprises a second upper surface 1024a and a second lower surface 1024b, and the second upper surface 1024a is located in the chamber 120. At least one of the first upper surface 1022a and the first lower surface 1022b is a rough surface. In one embodiment, the first upper surface 1022a is a rough surface, and the first lower surface 1022b is substantially slick. In another embodiment, the first upper surface 1022a is substantially slick, and the first lower surface 1022b is a rough surface. Because at least one of the first upper surface 1022a and the first lower surface 1022b is a rough surface, the upper sheet 1022 is semitransparent. Light transmittance can be in a range from about 40% to about 80%. In one embodiment, the upper sheet 1022 is a frosted glass, and the first lower surface 1022b is the rough surface. The rough surface of the upper sheet 1022 can be formed by etching or abrading. A material of the upper sheet 1022 can be glass or transparent polymer. The transparent polymer comprises polyethylene terephthalate, polyimide, polystyrene, polypropylene, polyethylene, polychloroprene, and PVC. The lower sheet 1024 and the side sheets 1026 are made of insulated materials, such as ceramic, resin, or plastic.

The colorful material layer 110 is located in the inner of the chamber 120. The colorful material layer 110 can be solid and become gas when it reaches its gasification temperature. Particularly, a material of the colorful material layer 110 sublimates easily, such as iodine or naphthalin. The colorful material layer 110 can be solid dye, such as indigo, fuchsine, tartrazine or methyl violet.

The first heating element 106 is located on a surface of the upper sheet 1022. The first heating element 106 can be located on the first upper surface 1022a or the first lower surface 1022b of the upper sheet 1022. The first heating element 106 should be transparent and can be a carbon nanotube sheet-shaped structure. The second heating element 108 is located on the second upper surface 1024a or the second lower surface 1024b of the lower sheet 1024. The second heating element 108 can be a carbon nanotube sheet-shaped structure, and transparent or opaque. The second heating element 108 can be a metal film, an ITO film or a carbon nanotube structure including carbon nanotubes arranged orderly or disorderly. In one embodiment according to FIGS. 1 and 2, the first heating element 106 is located on the first upper surface 1022a of the upper sheet 1022, and the second heating element 108 is located on the second lower surface 1024b of the lower sheet 1024.

The carbon nanotube sheet-shaped structure comprises a number of carbon nanotubes. In one embodiment, the carbon nanotube structure consists of the carbon nanotubes. The carbon nanotube structure is a free standing structure. "Free-standing structure" means that the carbon nanotube film does not have to be supported by a substrate and can sustain the weight of itself when it is hoisted by a portion thereof without tearing. The carbon nanotube structure comprises at least one carbon nanotube film. The structure of the carbon nanotube film can be the carbon nanotube film 1060, 1070 shown in FIGS. 3-6.

Figure 3:
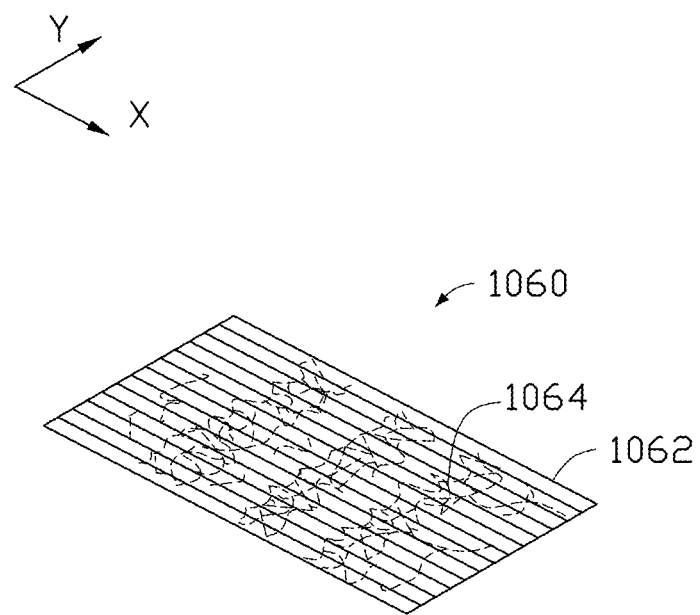
FIG. 3 is a schematic view of a carbon nanotube film including a number of carbon nanotube groups arranged as an array.
Figure 4:
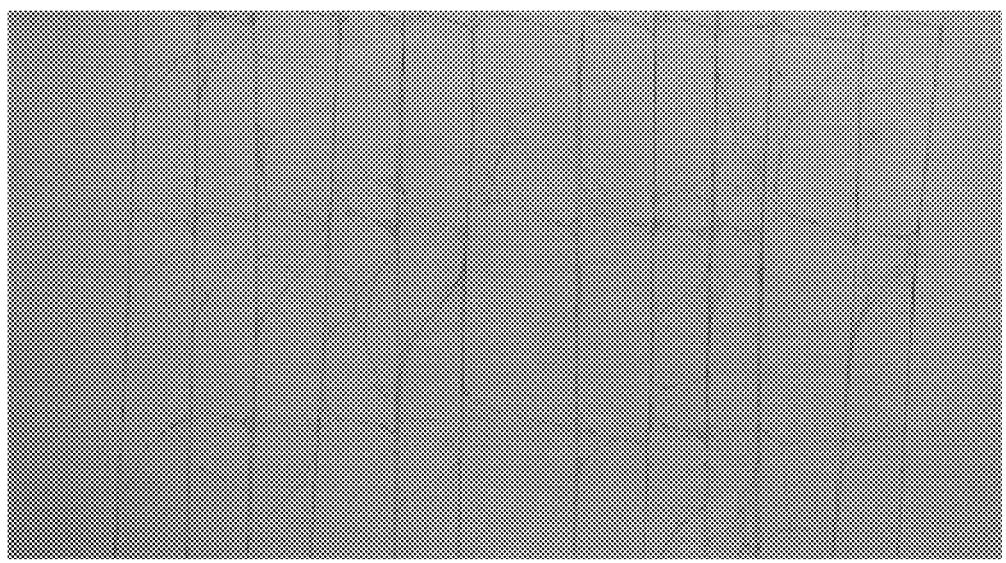
FIG. 4 is an optical microscope image of the carbon nanotube film shown in FIG. 3.
Figure 5:
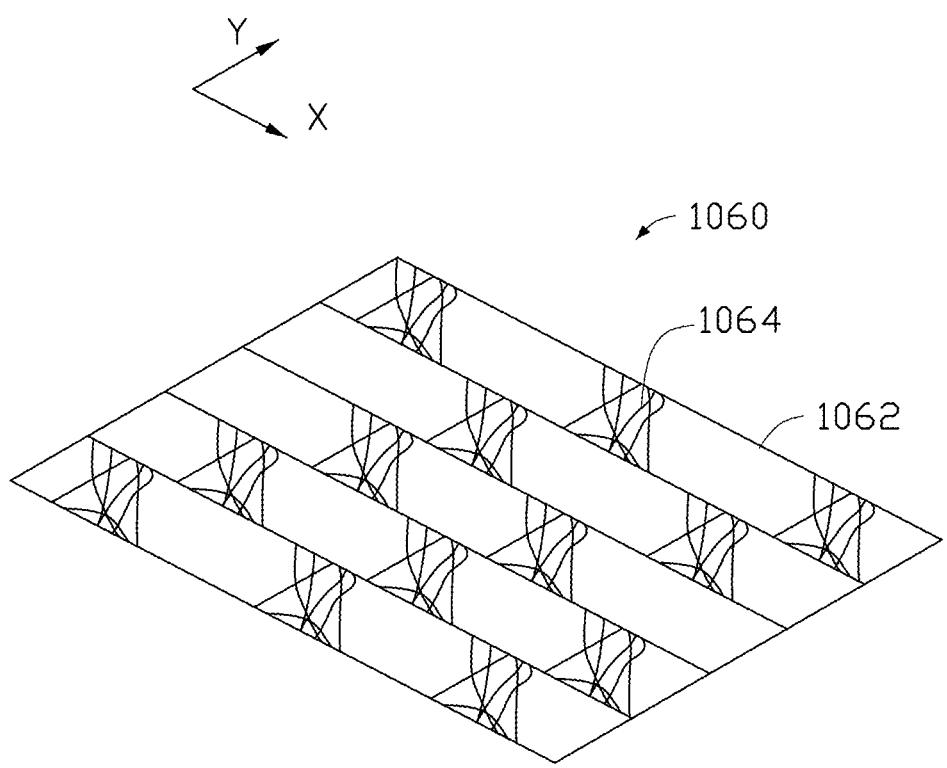
FIG. 5 is a schematic view of a carbon nanotube film including a number of carbon nanotube groups interlacedly arranged.

Referring to FIG. 3 and FIG. 4, the carbon nanotube film 1060 comprises a number of carbon nanotube linear units 1062 and a number of carbon nanotube groups 1064. The carbon nanotube linear units 1062 are spaced from each other. The carbon nanotube groups 1064 join with the carbon nanotube linear units 1062 by van der Waals force. The carbon nanotube groups 1064 located between adjacent carbon nanotube linear units 1062 are separated from each other.

Each carbon nanotube linear unit 1062 comprises a number of first carbon nanotubes extending substantially along a first direction X. Adjacent first carbon nanotubes extending substantially along the first direction X are joined end to end by van der Waals attractive force. In one embodiment, an axis of each carbon nanotube linear unit 1062 is substantially parallel to the axes of first carbon nanotubes in each carbon nanotube linear unit 1062. The carbon nanotube linear units 1062 extend substantially along the first direction X, and are separated from each other in a second direction Y, that intersects with the first direction X.

An intersection shape of each carbon nanotube linear unit 1062 can be a semi-circle, circle, ellipse, oblate spheroid, or other shapes. In one embodiment, the carbon nanotube linear units 1062 are substantially parallel to each other. Distances between adjacent carbon nanotube linear units 1062 are substantially equal. The carbon nanotube linear units 1062 are substantially coplanar. An effective diameter of each carbon nanotube linear unit 1062 is larger than or equal to 0.1 micrometers, and less than or equal to 100 micrometers. In one embodiment, the effective diameter of each carbon nanotube linear unit 1062 is larger than or equal to 5 micrometers, and less than or equal to 50 micrometers. A distance between adjacent two carbon nanotube linear units 1062 is not limited and can be selected as desired. In one embodiment, the distance between adjacent two carbon nanotube linear units 1062 is greater than 0.1 millimeters. Diameters of the carbon nanotube linear units 1062 can be selected as desired. In one embodiment, the diameters of the carbon nanotube linear units 1062 are substantially equal.

The carbon nanotube groups 1064 are separated from each other and combined with adjacent carbon nanotube linear units 1062 by van der Waals force in the second direction Y, so that the carbon nanotube film 1060 is a free-standing structure. The carbon nanotube groups 1064 are alternated with the carbon nanotube linear units 1062 on the second direction Y. In one embodiment, the carbon nanotube groups 1064 arranged in the second direction Y are separated from each other by the carbon nanotube linear units 1062. The carbon nanotube groups 1064 arranged in the second direction Y can connect with the carbon nanotube linear units 1062.

The carbon nanotube group 1064 comprises a number of second carbon nanotubes joined by van der Waals force. Axes of the second carbon nanotubes can be substantially parallel to the first direction X or the carbon nanotube linear units 1062. The axes of the second carbon nanotubes can also intersect with the first direction X or the carbon nanotube linear units 1062 such that the second carbon nanotubes in each carbon nanotube group 1064 intersect into a network structure.

The axes of second carbon nanotubes and the first direction X define first angles. Each first angle can be greater than or equal to 0 degrees, and less than or equal to 90 degrees. In one embodiment, the first angle is greater than or equal to 45 degrees, and less than or equal to 90 degrees. In another embodiment, the first angle is greater than or equal to 60 degrees, and less than or equal to 90 degrees.

In one embodiment, referring to FIG. 4, the carbon nanotube groups 1064 can be interlacedly located in the second direction Y and disorderly arranged in the second direction Y. As such, the carbon nanotube groups 1064 in the second direction Y form non-linear conductive paths. In one embodiment, referring to FIG. 3, the carbon nanotube groups 1064 are arranged into a number of columns in the second direction Y, thus the carbon nanotube groups 1064 form consecutive and linear conductive paths in the second direction. In one embodiment, the carbon nanotube groups 1064 in the carbon nanotube film are arranged in an array. A length of each carbon nanotube group 1064 in the second direction Y is substantially equal to the distance between adjacent carbon nanotube linear units 1062. The length of each carbon nanotube group 1064 in the second direction Y is greater than 0.1 millimeters. The carbon nanotube groups 1064 are also spaced from each other along the first direction X. Spaces between adjacent carbon nanotube groups 1064 in the first direction X are greater than or equal to 1 millimeter.

Therefore, the carbon nanotube film comprises a number of carbon nanotubes. The carbon nanotubes can be formed into carbon nanotube linear units 1062 and carbon nanotube groups 1064. In one embodiment, the carbon nanotube film consists of the carbon nanotubes. The carbon nanotube film defines a number of apertures. Specifically, the apertures are mainly defined by the separate carbon nanotube linear units 1062 and the spaced carbon nanotube groups 1064. The arrangement of the apertures is similar to the arrangement of the carbon nanotube groups 1064. In the carbon nanotube film, if the carbon nanotube linear units 1062 and the carbon nanotube groups 1064 are orderly arranged, the apertures are also orderly arranged. In one embodiment, the carbon nanotube linear units 1062 and the carbon nanotube groups 1064 are substantially arranged in an array, the apertures are also arranged in an array.

A ratio between a sum surface area of the carbon nanotube linear units 1062 and the carbon nanotube groups 1064 and a sum surface area of the apertures is less than or equal to 1:19. In other words, in the carbon nanotube film 1060, a ratio of the sum area of the carbon nanotubes to the sum area of the apertures is less than or equal to 1:19. In one embodiment, in the carbon nanotube film 1060, the ratio of the sum area of the carbon nanotube linear units 1062 and the carbon nanotube groups 1064 to the sum area of the apertures is less than or equal to 1:49. Therefore, a transparence of the carbon nanotube film 1060 is greater than or equal to 95%. In one embodiment, the transparence of the carbon nanotube film 1060 is greater than or equal to 98%.

The carbon nanotube film 1060 is an anisotropic conductive film. The carbon nanotube linear units 1062 form first conductive paths along the first direction, as the carbon nanotube linear units 1062 extend along the first direction X. The carbon nanotube groups 1064 combined with the carbon nanotube linear units on the second direction form second conductive paths along the second direction Y. The second conductive paths can be curved, as the carbon nanotube groups are interlacedly arranged. The second conductive paths can be linear, as the carbon nanotube groups are arranged as a number of columns and rows. Therefore, a resistance of the carbon nanotube film 1060 in the first direction X is different from a resistance of the carbon nanotube film 1060 in the second direction Y. The resistance of the carbon nanotube film 1060 in the second direction Y is 10 times greater than the resistance of the carbon nanotube film 1060 in the first direction X. In one embodiment, the resistance of the carbon nanotube film 1060 in the second direction Y is 20 times greater than the resistance of the carbon nanotube film 1060 in the first direction X. In one embodiment, the resistance of the carbon nanotube film 1060 in the second direction Y is about 50 times greater than the resistance of the carbon nanotube film 1060 in the first direction X. In the carbon nanotube film 1060, the carbon nanotube linear units 1062 are joined by the carbon nanotube groups 1064 in the second direction Y, which makes the carbon nanotube film 1060 strong and stable, and not broken easily.

There can be a few carbon nanotubes surrounding the carbon nanotube linear units and the carbon nanotube groups in the carbon nanotube film. However, these few carbon nanotubes have a small and negligible effect on the carbon nanotube film properties.

The carbon nanotube film 1060 can be made by the following steps: providing an original carbon nanotube film including a number of carbon nanotubes substantially extending along a first direction and joined end to end by van der Waal force; forming a patterned carbon nanotube film by patterning the original carbon nanotube film to define at least one row of through holes arranged in the original carbon nanotube film along the first direction, each row of the through holes including at least two spaced though holes; and treating the patterned carbon nanotube film with a solvent such that the patterned carbon nanotube film is shrunk into the carbon nanotube film. The solvent can be an organic solvent with a high volatility, such as alcohol, methanol, acetone, dichloroethane, or chloroform.

Figure 6:
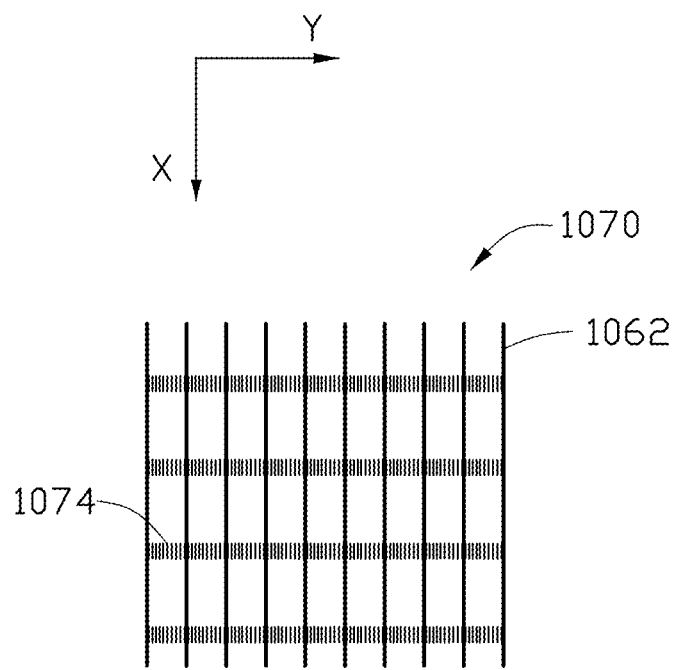
FIG. 6 is a schematic view of a carbon nanotube film including a number of carbon nanotubes substantially oriented along a same direction.
Figure 7:
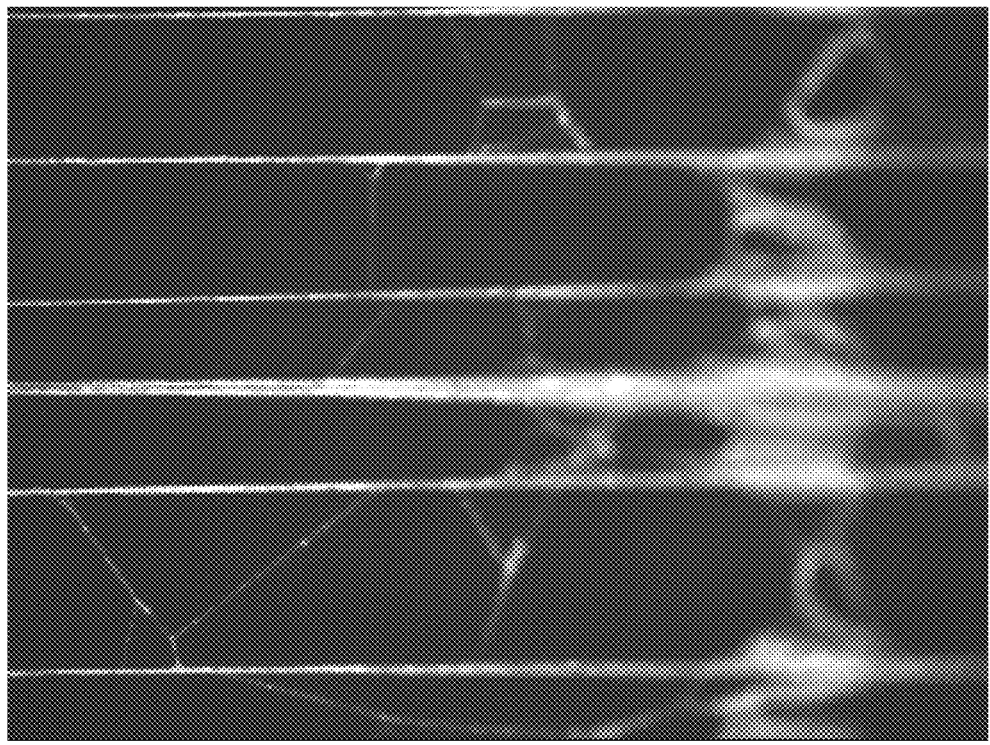
FIG. 7 is an optical microscope image of the carbon nanotube film shown in FIG. 6.

Referring FIG. 6 and FIG. 7, the carbon nanotube film 1070 comprises a number of carbon nanotubes. The carbon nanotube film 1070 comprises the carbon nanotube linear units 1062 and a number of second carbon nanotube groups 1074. Each second carbon nanotube group 1074 comprises a number of second carbon nanotubes extending along a direction which defines a second angle with the first direction X. The second angle can be greater than or equal to 0 degrees and less than or equal to 45 degrees. In one embodiment, the second angle is greater than or equal to 0 degrees and less than or equal to 30 degrees. In another embodiment, the carbon nanotubes in each second carbon nanotube group 1074 are substantially parallel to the first direction X and axis of the carbon nanotube linear units 1062. As such, the carbon nanotubes of the carbon nanotube film 1070 substantially extend along a same direction.

In addition, in the carbon nanotube film 1070, there is still a few carbon nanotubes surrounding the carbon nanotube linear units 1062 and the second carbon nanotube groups 1074, owing to the limitation of a method for making the carbon nanotube structure.

The method for making the carbon nanotube film 1070 is similar to the method for making the carbon nanotube film 1060. The difference is that the solvent used for treating the patterned carbon nanotube film has a weak interfacial tension. The solvent can be water, or a mixture of water and the organic solvent.

The carbon nanotube sheet-shaped structure can include a number of the carbon nanotube films. The carbon nanotube films can be stacked with each other or arranged side by side. The carbon nanotube linear units 1062 in each two adjacent carbon nanotube films can define an angle ranged from about 0 degrees to about 90 degrees.

The carbon nanotube sheet-shaped structure as the first heating element 106 has the following advantages. The carbon nanotube sheet-shaped structure mainly comprises the carbon nanotubes. The carbon nanotubes are not easily oxidized, and are electrically conductive, chemically stable and mechanically stable, even if the carbon nanotubes are in a moist condition. As such the first heating element 106 will also keep a low resistance, a chemical stableness and a mechanical stableness, even if the first heating element 106 is in a moist condition. Therefore, the life span of the first heating element 106 is long. Because the carbon nanotubes have a low density, the first heating element 106 is light, and the thermochromatic element 100 is light. The carbon nanotube sheet-shaped structure is flexible and can be arbitrarily folded without broken, thus the thermochromatic element 100 can be a flexible structure. As the heat capacity of the carbon nanotube layer structure is low, the temperature of the first heating element 106 using the carbon nanotube sheet-shaped structure can rise and fall quickly, and has a high response heating speed. Thus, the thermochromatic element 100 has a quick response, a high heating efficiency and accuracy. In addition, the transparence of the carbon nanotube film is greater than or equal to 95%, can be even greater than 98%. the first heating element 106 using the carbon nanotube film is transparent, so a definition of the thermochromatic element 100 is high. Furthermore, a definition of the thermochromatic display device using the thermochromatic element 10 is high.

The at least two first electrodes 114 are used to electrically connect the first heating element 106 and the output circuit and make the first heating element 106 produce Joule heat. The at least two first electrodes 114 can be fixed on the surface of the first heating element 106 by a conductive adhesive (not shown). The at least two first electrodes 114 are made of a conductive material. The shapes of the at least two first electrodes 114 are not limited and can be lamellar-shaped, rod-shaped, wire-shaped, or block-shaped. The cross sectional shape of the two first electrodes 114 can be round, square, trapezium, triangular, or polygonal. The thickness of the two first electrodes 114 can be any size, depending on the design, and can be about 1 micrometer to about 1 centimeter. In one embodiment as shown in FIGS. 1 and 2, the two first electrodes 114 both have a linear shape, and are located on the surface of the first heating element 106. The two first electrodes 114 are substantially parallel with each other. The two first electrodes 114 are electrically connected with the carbon nanotube linear units of the carbon nanotube film and located on two opposite ends of the carbon nanotube linear units. Furthermore, the two first electrodes 114 can be electrically connected with the output circuit by two electrodes wires (not shown). It can be noted that the at least two first electrodes 114 can be a number of first electrodes 114 located on two opposite sides of the first heating element 106.

The at least two second electrodes 116 are used to electrically connect the second heating element 108 and the output circuit to make the second heating element 108 produce Joule heat. The at least two second electrodes 116 can be fixed on the surface of the second heating element 108 by conductive adhesive (not shown). The material and the shape of the second electrodes 116 can be the same as the first electrodes 114. The relationship between the second electrodes 116 and the second heating element 108 can be the same as the relationship between the first electrodes 114 and the first heating element 106. Further, the two first electrodes 114 can be electrically connected with the output circuit by two electrodes wires (not shown).

The working principle of the thermochromatic element 100 is based on location change of the colorful material layer 110 under heat generated by the first heating element 106 and the second heating element 108 discussed in detail below. In a non-displaying status of the thermochromatic element 100, the colorful material layer 110 is supported by the lower sheet 1024 of the sealed enclosure 102 and away from the upper sheet 1022. Because the upper sheet 1022 is semitransparent, the colorful material layer 110 is not visible from the upper sheet 1022. If a voltage is applied on the second heating element 108 with the two second electrodes 116, the second heating element 108 will heat the colorful material layer 110 by the lower sheet 1024. When the colorful material layer 110 is heated to a temperature higher than its gasification temperature, it will become a gas and flow onto the first lower surface 1022b of the upper sheet 1022. Because a temperature of the upper sheet 1022 is low, the colorful material layer 110 will become solid again, attach on the first lower surface 1022b of the upper sheet 1022, and become visible from the upper sheet 1022. If a voltage is applied to the two first electrodes 114 and the voltage applied on the two second electrodes 116 is turned off, the first heating element 106 heats the colorful material layer 110 until it becomes gas. The colorful material layer 110 will flow onto the second upper surface 1024a of the lower sheet 1024 and the colorful material layer 110 will not visible from the upper sheet 1022. Because the colorful material layer 110 is colorful, the thermochromatic element 100 can show many colors.

Figure 8:
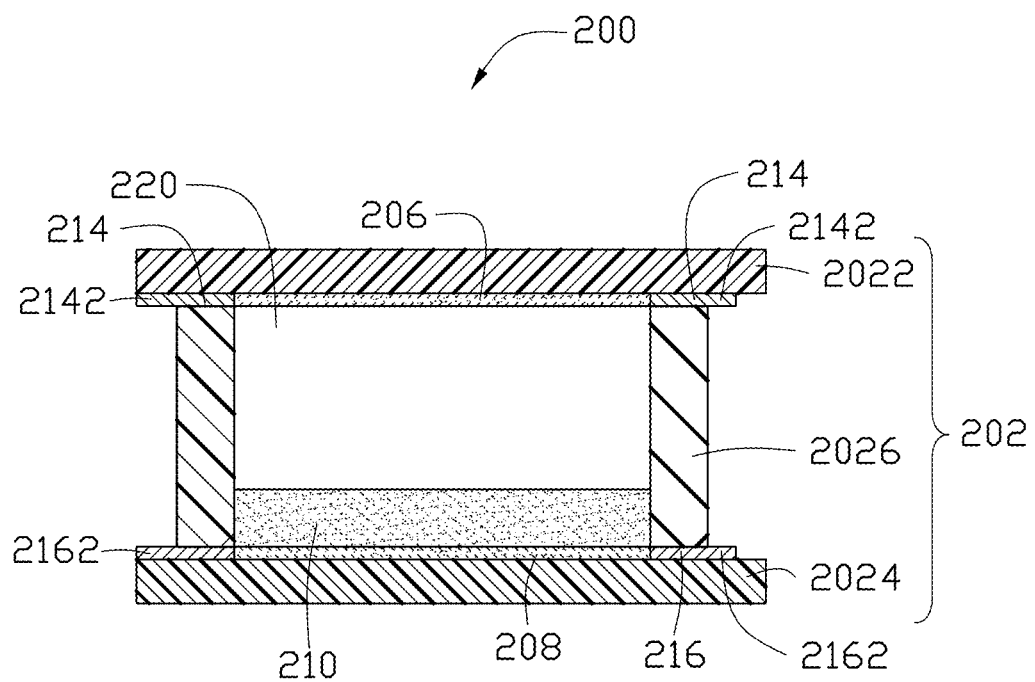
FIG. 8 is a cross-sectional side view of one embodiment of a thermochromatic element.

Referring to FIG. 8, one embodiment of a chromatic element 200 is provided. The chromatic element 200 comprises a sealed enclosure 202, a first heating element 206, a second heating element 208, a colorful material layer 210, and a chamber 220. The chromatic element 200 further comprises at least two first electrodes 214 and at least two second electrodes 216. The sealed enclosure 202 comprises an upper sheet 2022, a lower sheet 2024, and four side sheets 2026. The upper sheet 2022 comprises a first upper surface (not labeled) and a second lower surface (not labeled). The lower sheet 2024 comprises a second upper surface (not labeled) and a second lower surface (not labeled).

The first heating element 206 is located on the first lower surface of the upper sheet 2022, and directly contact with the colorful material layer 210 in the inner of the chamber 220. The second heating element 208 is located on the second upper surface of the lower sheet 2024, and directly contact with the colorful material layer 210. Each of the first electrodes 214 comprises a first extending portion 2142 extending to out of the sealed enclosure 202. Each of the second electrodes 216 comprises a second extending portion 2162 extending out of the sealed enclosure 202. The first extending portion 2142 can cause the first heating element 206 to electrically connect with the output circuit easily. The second extending portion 2162 enables the second heating element 208 to electrically connect with the output circuit easily.

Other characteristics of the chromatic element 200 are similar to the thermochromatic element 100 disclosed above.

Figure 9:
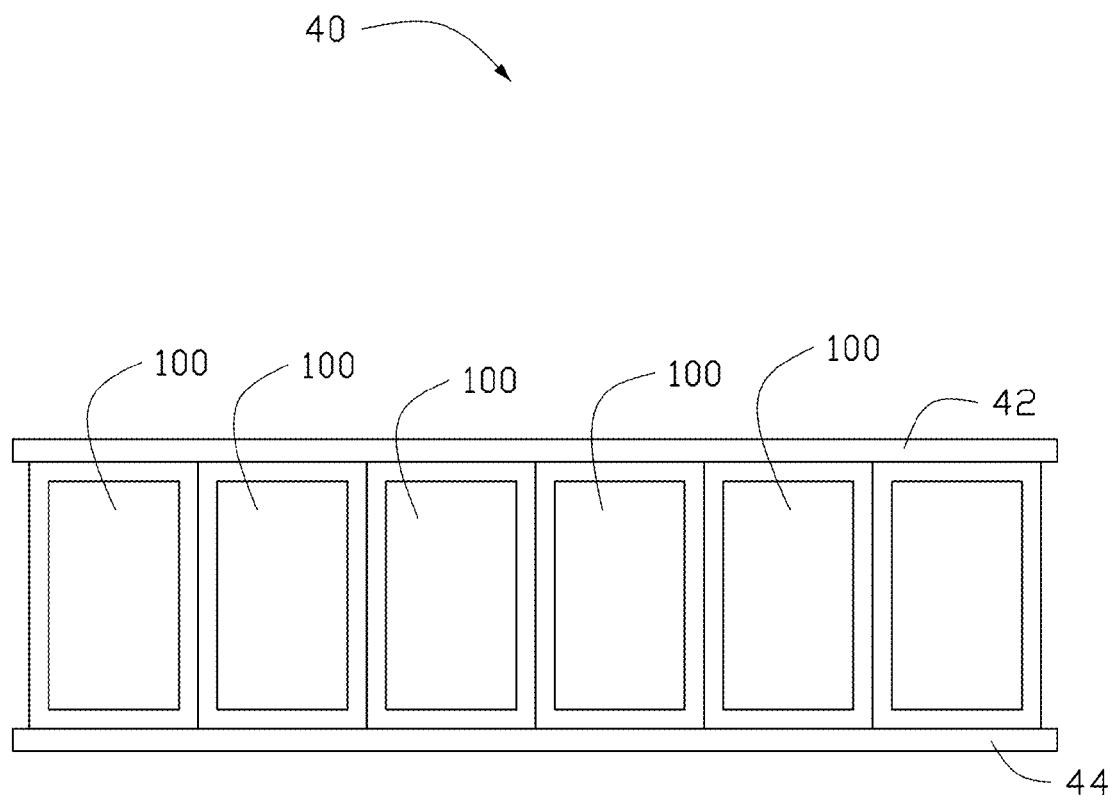
FIG. 9 is a side schematic view of one embodiment of a thermochromatic display device.

Referring to FIG. 9, a thermochromatic display device 40 according to one embodiment is provided. The chromatic display device 40 comprises a first electrode sheet 42, a second electrode sheet 44 and a plurality of thermochromatic elements 100 located between the first electrode sheet 42 and the second electrode sheet 44.

Figure 10:
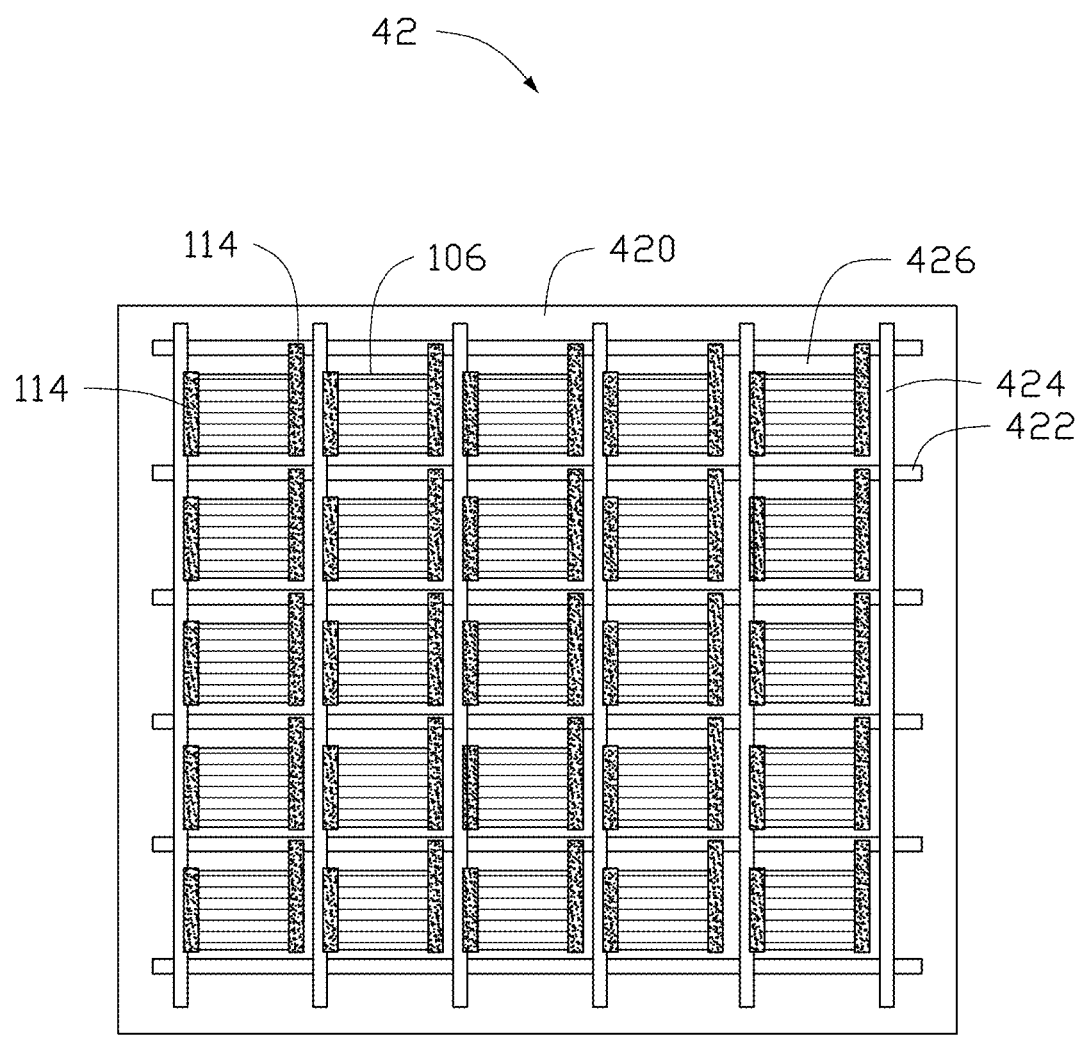
FIG. 10 is a schematic top plan view of a first electrode sheet used in the thermochromatic display device in FIG. 9.

Referring to FIG. 10, the first electrode sheet 42 is a transparent sheet and comprises a first surface 420. The first electrode sheet 42 comprises a plurality of first row electrodes 422 and a plurality of first line electrodes 424, located on the first surface 420. The plurality of first row electrodes 422 and the plurality of first line electrodes 424 are insulated from each other and intersect with each other to define an electrode cell including a plurality of first electrode cells 426.

Figure 11:
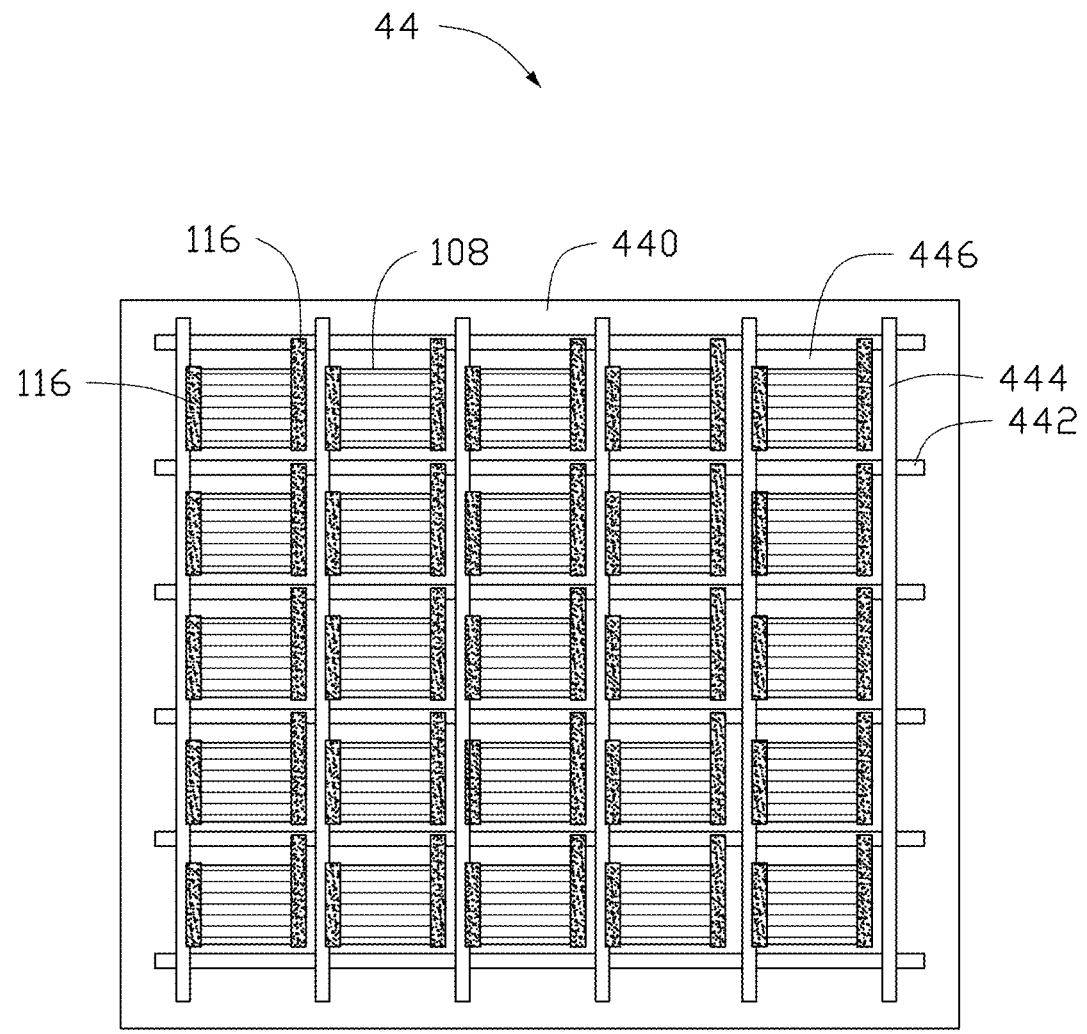
FIG. 11 is a schematic top plan view of a second electrode sheet used in the thermochromatic display device in FIG. 9.

Referring to FIG. 11, the second electrode sheet 44 comprises a second surface 440, a plurality of second row electrodes 442, a plurality of second line electrodes 444, and a plurality of second electrode cells 446. The structure of the second electrode sheet 44 is the same as the first electrode sheet 42. The second electrode sheet 44 can be transparent or opaque.

The first surface 420 of the first electrode sheet 42 faces the second surface 440 of the second electrode sheet 44. The first electrode cells 426 and the second electrode cells 446 are arranged opposite to each other in a one-to-one manner. Each first electrode cell 426 and each second electrode cell 446 are opposite to each other to define a display unit. Each display unit comprises one thermochromatic element 100. Referring also to FIG. 2, the upper sheet 1022 of each thermochromatic element 100 is located on the first surface 420 and in one first electrode cell 426, and the lower sheet 1024 is located on the second surface 440 and in one second electrode cell 446 opposite the first electrode cell 426. Because the first heating element 106 is located on the first upper surface 1022a of the upper sheet 1022, the first heating element 106 of each thermochromatic element 100 is located in one first electrode cell 426. The two first electrodes 114 of the thermochromatic element 100 are electrically connected with the first row electrode 422 and the first line electrode 424 forming the first electrode cell 426 in which the thermochromatic element 100 is located. Because the second heating element 108 is located on the second lower surface 1024b of the lower sheet 1024, the second heating element 108 of each thermochromatic element 100 is located in one second electrode cell 446. The two second electrodes 116 of the thermochromatic element 100 are electrically connected with the second row electrode 442 and the second line electrode 444 forming the second electrode cell 446 in which the chromatic element 100 is located.

The chromatic display device 40 further comprises at least one supporter (not shown) located between the first electrode sheet 42 and the second electrode sheet 44. The at least one supporter maintains a distance between the first electrode sheet 42 and the second electrode sheet 44. The at least one supporter can prevent the chromatic element 100 from being pressed by the first electrode sheet 42 of the second electrode sheet 44.

The chromatic display device 40 can control each thermochromatic element 100 with the first electrode sheet 42 and the second electrode sheet 44 to display or not display color. By controlling different thermochromatic elements 100, the chromatic display device 40 can show different information.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A thermochromatic display device, comprising:
   a first electrode sheet comprising a plurality of first row electrodes and a plurality of first line electrodes, the plurality of first row electrodes intersect with the plurality of first line electrodes to form a plurality of first electrode cells;
   a second electrode sheet facing the first electrode sheet and comprising a plurality of second row electrodes and a plurality of second line electrodes, the plurality of second row electrodes intersect with the plurality of second line electrodes to form a plurality of second electrode cells, the plurality of second electrode cells corresponding to the plurality of first electrode cells in a one-by-one manner to form a plurality of display cells; and
   a plurality of thermochromatic elements located in the plurality of display cells in a one-to-one manner and located between the first electrode sheet and the second electrode sheet; each of the plurality of thermochromatic elements comprising:
     a sealed enclosure comprising a semitransparent upper sheet and a lower sheet opposite to the semitransparent upper sheet, the sealed enclosure defining a chamber between the semitransparent upper sheet and the lower sheet;
     a first transparent heating element located on the semitransparent upper sheet and comprising a carbon nanotube film comprising:
       a plurality of carbon nanotube linear units spaced from each other and substantially extending along a first direction, each of the plurality of carbon nanotube linear units comprising a plurality of first carbon nanotubes substantially oriented along the first direction; and
       a plurality of carbon nanotube groups combined with the plurality of carbon nanotube linear units by van der Waals force, the plurality of carbon nanotube groups between adjacent carbon nanotube linear units spaced from each other in the first direction;
     a second heating element located on the lower sheet; and
     a colorful material layer located in the chamber, the first transparent heating element and the second heating element asynchronously capable of heating the colorful material layer to make the colorful material layer move between the first transparent heating element and the second heating element in response to the heat produced by the first transparent heating element and the second heating element;
   wherein in each of the plurality of thermochromatic elements, the first transparent heating element is electrically connected with the one of the plurality of first row electrodes and one of the plurality of first line electrodes; and the second heating element is electrically connected with the one of the plurality of second row electrodes and one of the plurality of second line electrodes.

2. The thermochromatic display device of claim 1, wherein the plurality of carbon nanotube linear units are substantially parallel to each other, and the plurality of carbon nanotube groups are arranged to form a plurality of columns.

3. The thermochromatic display device of claim 2, wherein the plurality of carbon nanotube groups are alternated with the plurality of carbon nanotube linear units along a second direction, that intersects with the first direction.

4. The thermochromatic display device of claim 1, wherein the carbon nanotube film is a free-standing structure, and defines a plurality of apertures.

5. The thermochromatic display device of claim 4, wherein a ratio of a sum surface area of the plurality of carbon nanotube linear units and the plurality of carbon nanotube groups to a sum surface area of the plurality of apertures is less than or equal to 1:19.

6. The thermochromatic display device of claim 5, wherein the ratio of the sum surface area of the plurality of carbon nanotube linear units and the plurality of carbon nanotube groups to the sum surface area of the plurality of apertures is less than or equal to 1:49.

7. The thermochromatic display device of claim 1, wherein the semitransparent upper sheet comprises at least one rough surface.

8. The thermochromatic display device of claim 1, wherein a light transmittance of the semitransparent upper sheet is in a range from about 40% to about 80%.

9. The thermochromatic display device of claim 1, further comprising two first electrodes and two second electrodes, wherein the two first electrodes are spaced from each other and electrically connected with the first transparent heating element, and the two second electrodes are spaced from each other and electrically connected with the second heating element.

10. The thermochromatic display device of claim 9, wherein the two first electrodes are electrically connected with the carbon nanotube linear units, of the carbon nanotube film, and located at two opposite ends of the carbon nanotube linear units.

11. The thermochromatic display device of claim 1, wherein a diameter of each carbon nanotube linear unit is larger than or equal to 0.1 micrometers, and less than or equal to 100 micrometers.

12. The thermochromatic display device of claim 1, wherein each of the plurality of carbon nanotube groups comprises a plurality of second carbon nanotubes that are substantially oriented along the first direction.

13. The thermochromatic display device of claim 1, wherein each of the plurality of carbon nanotube groups comprises a plurality of second carbon nanotubes intersected with each other to form a net structure.

14. The thermochromatic display device of claim 1, wherein the plurality of first row electrodes and the plurality of first line electrodes are insulated from each other, and the plurality of second row electrodes and the plurality of second line electrodes are insulated from each other.

15. The thermochromatic display device of claim 1, wherein the first electrode sheet comprises a first surface, and the second electrode sheet comprises a second surface facing the first surface; and the plurality of first row electrodes and the plurality of first line electrodes are located on the first surface, and the plurality of second row electrodes and the plurality of second line electrodes are located on the second surface.

16. The thermochromatic display device of claim 1, wherein the first electrode sheet is a transparent sheet.

17. The thermochromatic display device of claim 1, wherein the second electrode sheet is transparent or opaque.

* * * * *